Aug. 17, 1926.
W. E. SANDSTEDT
1,596,768
HOSE COUPLING
Filed March 9, 1926
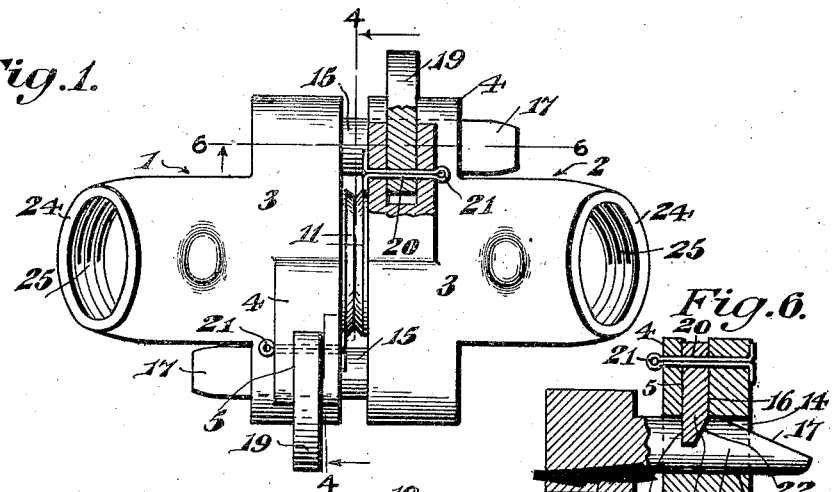
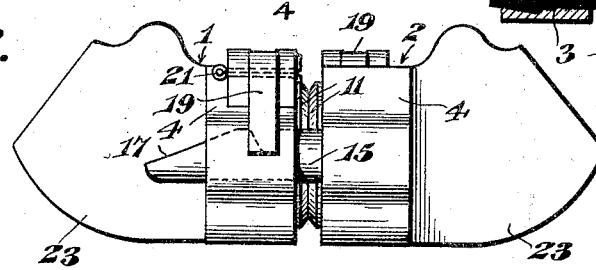
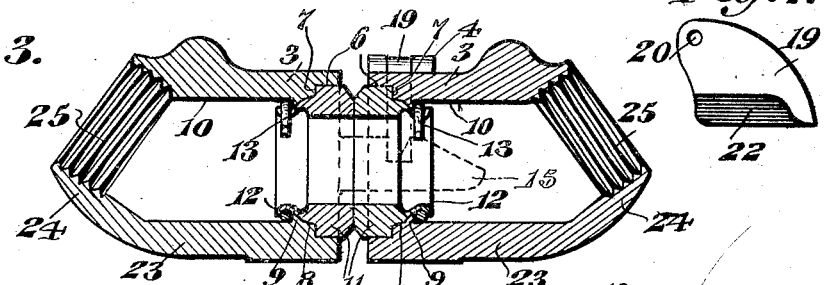
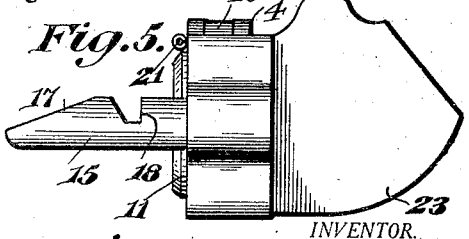
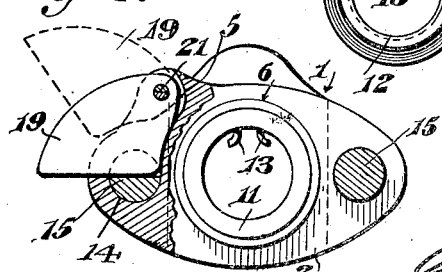
INVENTOR.
William E. Sandstedt,
BY
Geo. P. Kimmel, ATTORNEY.

Patented Aug. 17, 1926.

1,596,768

UNITED STATES PATENT OFFICE.

WILLIAM E. SANDSTEDT, OF PORT ANGELES, WASHINGTON.

HOSE COUPLING.

Application filed March 9, 1926. Serial No. 93,436.

This invention relates to a hose coupling designed primarily for use in connection with the steam lines of railway cars, although it is to be understood that a coupling in accordance with this invention can be employed for any purposes for which it is found applicable, and the invention has for its object, to provide in a manner as hereinafter set forth, a pair of interengaging coupling elements for expeditiously and satisfactorily coupling together a pair of opposed steam conducting hose pipe lines together and further for reducing to a minimum wear on the gasket carried by the coupling elements whereby the life of the gasket is materially increased.

A further object of the invention is to provide, in a manner as hereinafter set forth, a coupling for the purpose referred to to overcome kinking of the hose lines thereby reducing wear thereon to increase the life thereof, under such conditions decreasing the cost of maintenance and which provides for economy when the coupling is employed.

Further objects of the invention are to provide, in a manner as hereinafter set forth, a hose coupling for the purpose referred to which is simple in its construction and arrangement, strong, durable, compact, thoroughly efficient in its use, conveniently operated or set in coupling position, readily installed with respect to the hose lines, and inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is a top plan view of a hose coupling in accordance with this invention.

Figure 2 is a side elevation thereof.

Figure 3 is a longitudinal sectional view thereof.

Figure 4 is a section on line 4—4 Figure 1.

Figure 5 is a side elevation of one of the coupling elements when in detached position.

Figure 6 is a section on line 6—6 Figure 1.

Figure 7 is a side elevation of the latch member.

Figure 8 is a rear view of the gasket.

A hose coupling, in accordance with this invention comprises a pair of oppositely disposed coupling elements referred to generally at 1 and 2. As each of the coupling elements is of the same construction, but one will be described, as the description of one will apply to the other.

Each of the coupling elements consists of a horizontally disposed oval-shaped head 3 of substantial width, length and thickness and formed integral with the top of the head, at one side of the vertical median thereof, is an enlargement 4 of less thickness than the thickness of the head and the said enlargement 4 has its outer face flush with the outer face of the head 3. The enlargement 4 extends lengthwise with respect to the head 3 and is formed with a lengthwise extending slot 5 which opens at its outer end at the outer end of the enlargement and terminates at its inner end at a point removed from the inner end of the enlargement.

The head 3 is formed with a centrally disposed opening having the wall thereof constructed to provide a portion of greater diameter as indicated at 6, an annular shoulder 7, a bevelled portion 8 extending rearwardly and with the bevel projecting towards the axis of the opening and with the bevelled portion 8 terminating in an annular shoulder 9 arranged rearwardly with respect to the shoulder 7, and a portion 10 of less diameter than the portion 6. The length of the portion 6 of greater diameter of the opening is materially less than the portion of smaller diameter of the opening as indicated at 10. Mounted in the head 3, as well as projecting from the outer face thereof, is a gasket 11 shaped to seat against the portion 6, shoulder 7, and bevelled portion 8. The gasket 11 has its inner end provided with an extension 12 which projects beyond the shoulder 9 and said extension 12 carries a retaining spring 13 which in connection with the shoulder 9 secures the gasket 11 to the head 3 and in a manner whereby the gasket will project from the head 3 as illustrated in Figure 3.

The head 3, between the central opening formed therein and one end, is provided with a guide opening 14 for a locking bar 15. The top of the opening 14 is intersected by a slot 16 formed in the head 3 and which registers with the slot 5. Carried by the other end of the head 3 and preferably formed integral therewith is a locking bar 15 which corresponds in contour to the shape of the opening 14 and said locking bar has the upper portion thereof at its outer terminal part cut away to provide a bevelled face 17 of appropriate length and which forms the outer part of the bar of tapered contour. Between the rear end of the bevelled surface or face 17 and the head 3, the bar 15 has formed in the top thereof a groove 18 having its rear wall perpendicular and its forward wall forwardly inclined. The forward wall of the groove 18 has its upper end merge into the rear end of the bevelled surface or face 17. See Figure 6. The slot 5 is disposed in a plane between the longitudinal median and front face of the head 3 and the slot 16 is formed in the head 3 between its longitudinal median and its front face and aligns with the slot 5 or in other words the walls of the slot 5 form a continuation of the wall of the slot 16.

Positioned within aligning slots 5 and 16 is a latching member 19 of triangular contour and the function of which is to engage in the groove 18 in a locking bar 15 to secure it in position. The latching member 19 at its upper end is formed with an opening 20 to provide for the passage of a pivot 21 therefor and said pivot 21 is secured to the enlargement 4 and extends through the slot 5 at the upper portion thereof. As shown the pivot 21 is in the form of a cotter pin. The latching member 19 is of greater width than either slot 5 or 16 and projects from the head 3 so that it can be quickly shifted to and from latching position with respect to a locking bar 15. The lower portion of the latching member 19, at one side thereof, for a portion of its width is bevelled as at 22 so that the said bevelled portion will provide a part of the lower end of the latching member 19 to conform to the shape of the groove 18. In Figure 4 of the drawings the latching member 19 is illustrated in full lines in latching position and in dotted lines in released position with respect to the bar 15.

Formed integral with the rear face of the head 3 is a longitudinally disposed hollow extension 23 having its inner diameter conforming to the diameter of the portion 10 of the central opening formed in the head 3. The rear end of the extension 23 is angularly disposed as at 24 and provided with interior threads as at 25 for threadably engaging with a steam hose nipple, not shown, and said angularly disposed rear portion 24 can be set up at an angle with respect to the central opening formed in the head 3 to suit the requirements of the surface to which it is applied.

In coupling a pair of hose lines together, each of the latter being attached to one of the coupling elements, the oppositely disposed locking bars 15 are pushed through the oppositely disposed openings 14 and as the bars 15 have tapered outer ends they will engage with the latching member 19 and pass under same and when the grooves 18 pass under the lower ends of the latching members, these latter will fall into said grooves 18 and the latching members are tapped lightly with a hammer to tighten them up. Any vibration of the coupling or wear of the gasket will cause the latching members to fall down further into the grooves 18 and cause the latches to bind tighter. The grooves in the locking bars 15 are set up with enough clearance to allow for wear. The slots 5 and the pivot for the latching members 19 hold these latter in place. To release the latching members they are manually or otherwise moved to dotted line position shown in Figure 4 and when shifted to such position the locking bar 15 can be removed from the opening 14.

It is thought the many advantages of a hose coupling, in accordance with this invention and for the purpose set forth, can be readily understood, and although the preferred embodiment of the invention is as illustrated and described, yet it is to be understood that changes in the details of construction can be had which will fall within the scope of the invention as claimed.

What I claim is:—

1. A hose coupling comprising a pair of oppositely disposed interengaging coupling elements each consisting of a head having a central opening, a hollow extension on the rear of the head, forming a continuation of said opening and having an angularly disposed interiorly threaded rear end, said heads further having an opening at one side of said central opening and a slot intersecting that opening at the side of the central opening, said heads further having at the other side of said central opening a forwardly projecting transversely grooved locking bar, and a locking bar latching member operating in said slot and pivotally connected to the head.

2. A hose coupling comprising a pair of oppositely disposed hollow coupling elements each provided with an opening and a slot intersecting the latter, a locking bar carried by each element and extending through the opening in the other element, said bars having tapered outer ends and a groove in the top thereof, and a latching member pivotally carried by each element, operating in the slot of its respective element and engaging in the groove of the locking bar of the other element for detachably connecting said elements together, and each of said latching members having a bevelled lower portion.

3. A hose coupling comprising a pair of oppositely disposed hollow coupling elements each provided with an opening and a slot intersecting the latter, a locking bar carried by each element and extending through the opening in the other element, said bars having tapered outer ends and a groove in the top thereof, a latching member pivotally carried by each element, operating in the slot of its respective element and engaging in the groove of the locking bar of the other element for detachably connecting said elements together, and each of said latching members having a bevelled lower portion, and each of said coupling elements having an angularly disposed rear end provided with interior threads for connection with a hose nipple.

4. A hose coupling comprising a pair of oppositely disposed hollow coupling elements each provided with an opening and a slot intersecting the latter, a locking bar carried by each element and extending through the opening in the other element, said bars having tapered outer ends and a groove in the top thereof, a latching member pivotally carried by each element, operating in the slot of its respective element and engaging in the groove of the locking bar of the other element for detachably connecting said elements together, each of said latching members having a bevelled lower portion, and each of said coupling elements having an angularly disposed rear end provided with interior threads for connection with a hose nipple, and each of said grooves conforming in contour to the shape of the bevelled portion of a latching member.

5. A hose coupling comprising a pair of oppositely disposed hollow coupling elements each provided with an opening and a slot intersecting the latter, a locking bar carried by each element and extending through the opening in the other element, said bars having tapered outer ends and a groove in the top thereof, a latching member pivotally carried by each element, operating in the slot of its respective element and engaging in the groove of the locking bar of the other element for detachably connecting said elements together, each of said latching members having a bevelled lower portion, and each of said latching members of a width materially greater than the width of a slot and having the pivot therefor at the upper end thereof.

6. A hose coupling comprising a pair of oppositely disposed hollow coupling elements each provided with an opening and a slot intersecting the latter, a locking bar carried by each element and extending through the opening in the other element, said bars having tapered outer ends and a groove in the top thereof, a latching member pivotally carried by each element, operating in the slot of its respective element and engaging in the groove of the locking bar of the other element for detachably connecting said elements together, each of said latching members having a bevelled lower portion, each of said latching members of a width materially greater than the width of a slot and having the pivot therefor at the upper end thereof, and each of said grooves conforming in contour to the shape of a bevelled lower portion of a latching member.

7. A hose coupling comprising a pair of oppositely disposed hollow coupling elements each provided with a horizontally disposed oval-shaped head of a length to project from the remaining portion of its respective element, each of said heads provided at one end with an opening and a slot intersecting the latter, said slot arranged in the upper portion of said end, a locking bar carried by the other end of the head of each element and adapted to extend through the opening in the other element, said bars having tapered outer ends and each formed with a groove in the top thereof, and a latching member pivoted to each of the heads at that end thereof provided with the slot, said latching members operating in the slots of said elements and each engaging the groove of a locking bar for detachably connecting said elements together.

8. A hose coupling comprising a pair of oppositely disposed hollow coupling elements each provided with a horizontally disposed oval-shaped head of a length to project from the remaining portion of its respective element, each of said heads provided at one end with an opening and a slot intersecting the latter, said slot arranged in the upper portion of said end, a locking bar carried by the other end of the head of each element and adapted to extend through the opening in the other element, said bars having tapered outer ends and each formed with a groove in the top thereof, a latching member pivoted to each of the heads at that end thereof provided with the slot, said latching members operating in the slots of said elements and each engaging in the groove of a locking bar for detachably connecting said elements together, each of said latching members of a width materially greater than the width of the slot, projecting from the head and having the pivot therefor at the upper end thereof.

9. A hose coupling comprising a pair of oppositely disposed hollow coupling elements each provided with a horizontally disposed oval-shaped head of a length to project from the remaining portions of its respective element, each of said heads provided at one end with an opening and a slot intersecting the latter, said slot arranged in the upper portion of said end, a locking bar carried by the other end of the head of each element and adapted to extend through the opening in the other element, said bars having tapered outer ends and each formed with a groove in the top thereof, a latching member pivoted to each of the heads at that end thereof provided with the slot, said latching members operating in the slots of said elements and each engaging in a groove of the locking bar for detachably connecting said elements together, each of said latching members of a width materially greater than the width of the slot, projecting from the head and having the pivot therefor at the upper end thereof, and each of said latching members having the lower part thereof bevelled and each of said grooves conforming in contour to the shape of the bevelled part of the latching member.

In testimony whereof, I affix my signature hereto.

WILLIAM E. SANDSTEDT.